United States Patent [19]

Herr

[11] 4,384,873

[45] May 24, 1983

[54] CENTRAL STEAM HUMIDIFIER

[75] Inventor: Dean S. Herr, Willow Street, Pa.

[73] Assignee: Herrmidifier Company, Inc., Lancaster, Pa.

[21] Appl. No.: 347,638

[22] Filed: Feb. 10, 1982

[51] Int. Cl.³ .............................................. B01D 45/02
[52] U.S. Cl. ........................................ 55/263; 55/426; 55/428; 261/116; 261/118; 261/DIG. 15; 261/DIG. 76; 239/121; 239/132; 239/553
[58] Field of Search ...................... 239/132, 121, 553; 261/DIG. 76, 118, 116, DIG. 15; 55/263, 426, 428

[56] References Cited

U.S. PATENT DOCUMENTS

| | | | |
|---|---|---|---|
| 2,809,867 | 10/1957 | Dupasquier | 239/121 |
| 2,949,239 | 8/1960 | Goyette | 239/121 |
| 3,096,817 | 7/1963 | McKenna | 261/DIG. 76 |
| 3,386,659 | 6/1968 | Rea | 239/132 |
| 3,530,647 | 9/1970 | Wetzel | 55/263 |
| 3,642,201 | 2/1972 | Potchen | 261/117 |
| 3,724,180 | 4/1973 | Morton et al. | 239/132 |
| 3,857,514 | 12/1974 | Clifton | 239/132 |
| 3,923,483 | 12/1975 | Hilmer et al. | 239/132 |
| 4,050,630 | 9/1977 | Dupasquier | 239/121 |
| 4,265,840 | 5/1981 | Bahler | 239/553 |

Primary Examiner—Tim R. Miles
Attorney, Agent, or Firm—Brady, O'Boyle & Gates

[57] ABSTRACT

To reduce substantially the amount of tubing for condensate being returned from the steam distribution manifold and to enable such condensate to revaporize as steam, thereby increasing the thermal efficiency of the humidifier, a condensate baffle in the bottom of the steam distribution manifold projects with the manifold into the steam separator through a common coupling between the separator and manifold and downstream from the steam admission needle valve of the separator. Structural compactness with economy is achieved.

6 Claims, 8 Drawing Figures

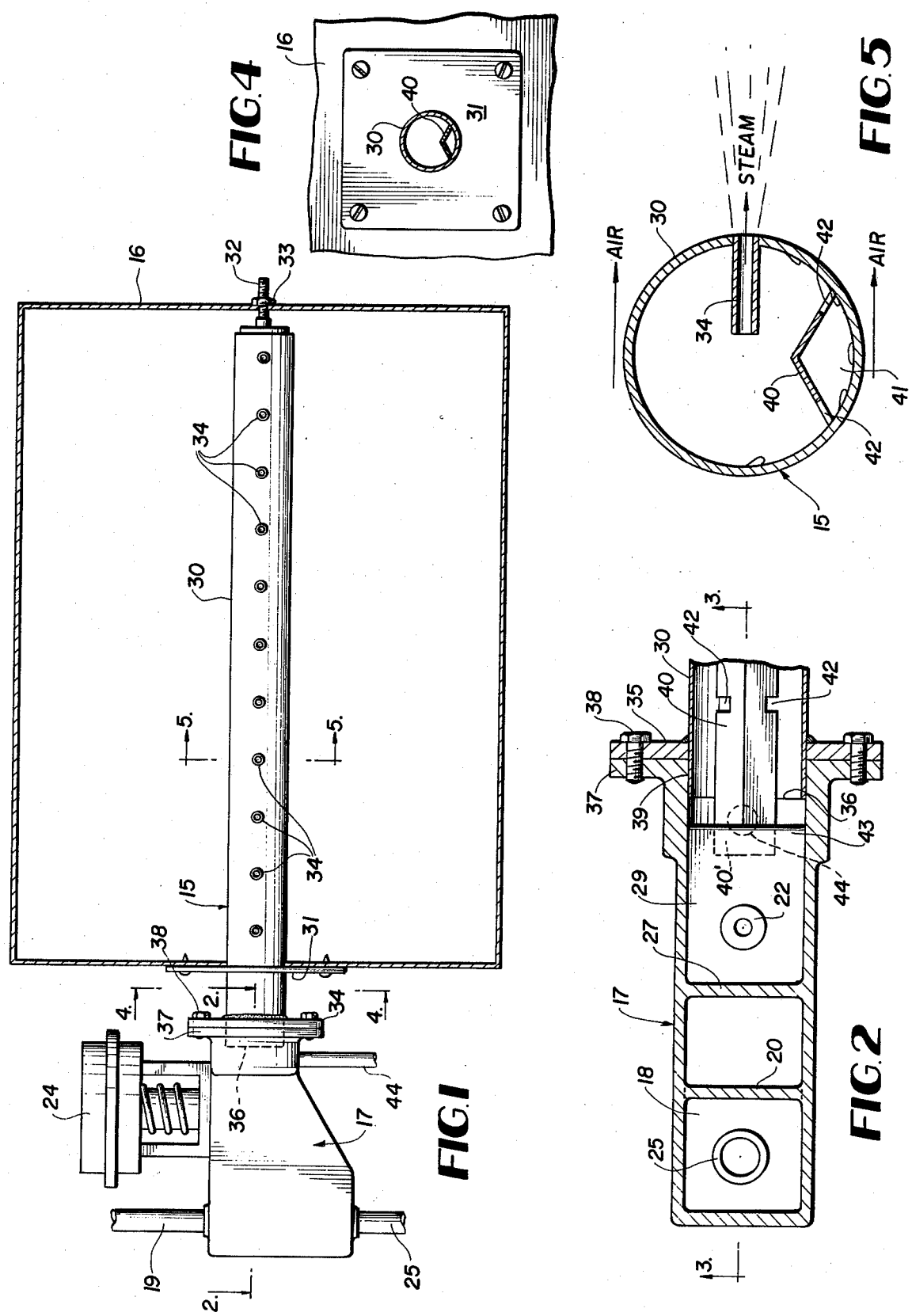

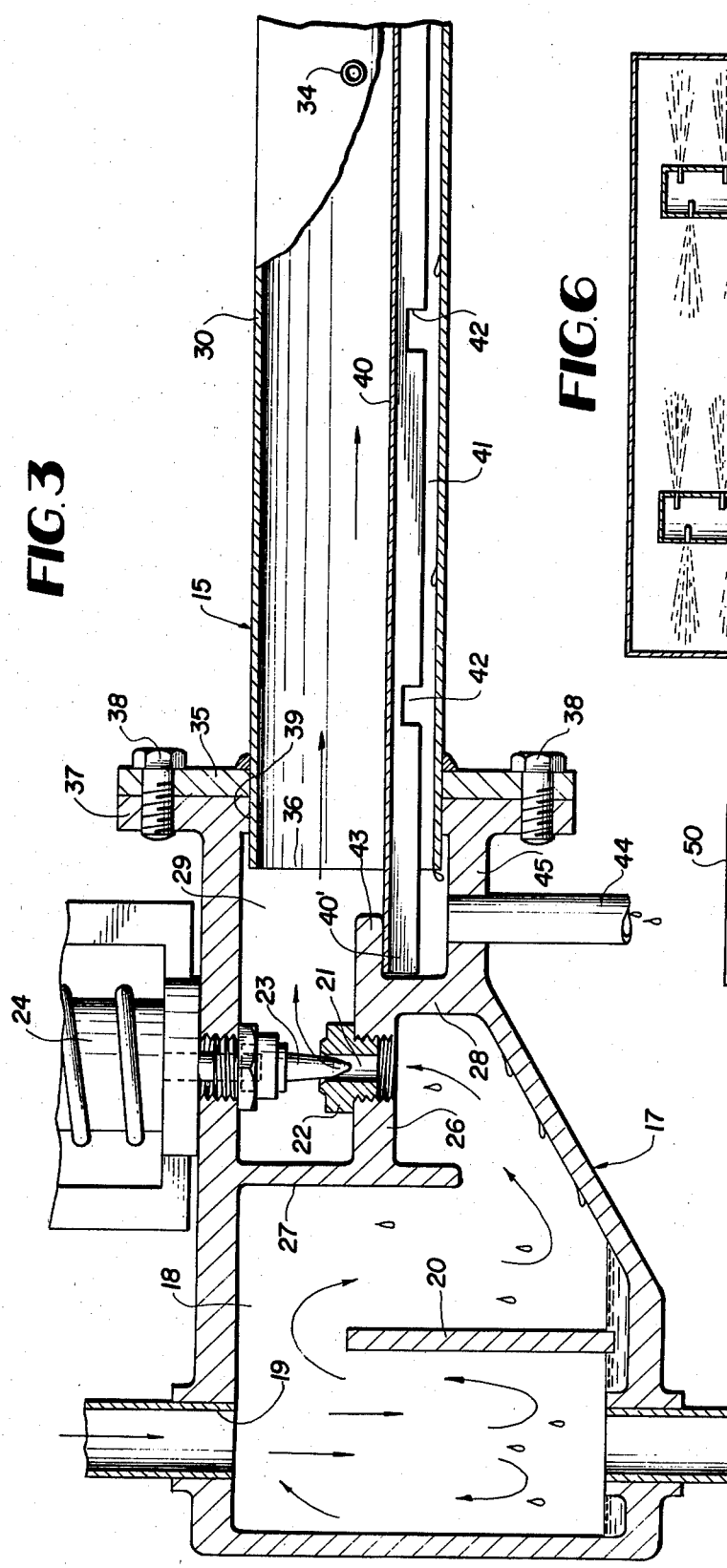

CENTRAL STEAM HUMIDIFIER

BACKGROUND OF THE INVENTION

The present invention relates to a central steam humidifier of the type in which steam is injected by nozzles in a distribution manifold or manifolds into the interior of a heating duct or the like. Humidifiers of this type are exemplified by U.S. Pat. Nos. 3,386,659; 3,642,201; 3,857,514; and 3,923,483 and certain known commercial prior art, and it is the objective of this invention to improve on the prior art, particularly with relation to the means for returning liquid condensate from the steam distribution manifold to a drain leading to a condensate trap.

In much of the prior art, condensate return tubing external to the steam separator and connected to the far end of the distribution manifold is employed. Such arrangements are costly and significantly increase the complexity of piping or tubing required for the humidifier.

More particularly, in accordance with the present invention, condensate from the steam distribution manifold is directed into the discharge chamber of the steam separator for passage into a drain line near the outlet of the separator at a point downstream from the needle valve of the separator. A common coupling is utilized to secure the steam distribution manifold and a condensate baffle contained therein in assembled relationship with the steam separator.

In other prior art humidifiers, condensate return tubing is contained within the body of the distribution manifold and leads to a drain connection outside of the separator unit. This relatively complicated arrangement is also avoided by the present invention.

A distinct advantage over the prior art possessed by the invention due to returning the condensate into the separator is the ability of the system to vaporize some of the condensate before delivering it to the drain pipe, thus avoiding loss of valuable energy.

Other objects and advantages of the invention will become apparent during the course of the following description.

BRIEF DESCRIPTION OF THE DRAWINGS

FIG. 1 is a side elevation of a central steam humidifier according to the invention.

FIG. 2 is an enlarged fragmentary horizontal section taken on line 2—2 of FIG. 1.

FIG. 3 is an enlarged fragmentary vertical section taken on line 3—3 of FIG. 2.

FIG. 4 is a fragmentary vertical section taken on line 4—4 of FIG. 1.

FIG. 5 is a similar section taken on line 5—5 of FIG. 1, but on an enlarged scale.

FIG. 6 is a side elevational view in cross section showing a modified form of humidifier according to the invention having parallel branch distribution manifolds.

FIG. 7 is an enlarged fragmentary horizontal section taken on line 7—7 of FIG. 6.

FIG. 8 is an enlarged fragmentary vertical section taken on line 8—8 of FIG. 6.

DETAILED DESCRIPTION

Referring to the drawings in detail wherein like numerals designate like parts, a central steam humidifier 15 in accordance with the invention delivers jets of steam into the air stream passing through a heating air duct 16, FIG. 1, in parallel relationship to the air stream as indicated by the air and steam directional arrows in FIG. 5 to humidify such air. The humidifier 15 comprises a steam separator 17 having a dry steam chamber 18 into which live steam is delivered downwardly through a delivery pipe 19 suitably connected in the top wall of the separator. A vertical baffle plate 20 in the steam chamber 18 causes the steam therein to follow a tortuous path leading to the bore 21 of a seat 22 for a steam metering needle valve 23 regulated by a suitable controller 24 in accordance with the prior art. The bore 21 and needle valve 23 have a common axis which is parallel to the axis of steam delivery pipe 19. Condensate from the needle valve falls to the bottom of the chamber 18 and is removed by a descending drain pipe 25.

The seat 22 is supported by an internal horizontal wall 26 of the steam separator and is joined with two vertical walls 27 and 28 in the separator. These walls separate the steam chamber 18 from a downstream chamber 29 from which metered steam flows directly into a steam distribution manifold 30 having a horizontal axis and substantially completely spanning the air duct 16, FIG. 1.

The distribution manifold 30 near its upstream end is supported on one side wall of the duct 16 by a mounting plate 31. At its far end, the distribution manifold is supported on the other side wall of the duct 16 by a threaded stud 32 carrying a nut 33, the stud being suitably attached to the end of the manifold 30.

The distribution manifold 30 carries on one side thereof a plurality of spaced parallel steam nozzle tubes 34 of equal lengths, whose outer ends may be threaded or otherwise secured in the wall of manifold 30, and whose inner ends terminate near the center of the distribution manifold.

The manifold 30 has a fixed coupling flange 35 welded thereto near and spaced from its upstream end 36. This coupling flange abuts a mating coupling flange 37 of steam separator 17 and is secured thereto by screws 38. The adjacent end 36 of manifold 30 projects inside of the chamber 29 of steam separator 17 through an opening 39 provided in the flange 37. A simplified and secure coupling between the separator 17 and distribution manifold 30 is thus provided.

In accordance with the invention, an inverted V-cross section baffle 40 is fixedly supported in the bottom of manifold 30 to form a flow passage 41 beneath it for condensate and to separate such condensate from the steam above the baffle 40. The baffle 40 along its opposite sides at longitudinally spaced intervals is provided with condensate inlet notches 42. The baffle 40 extends for the length of the distribution manifold 30 and beyond the upstream end 36 thereof so as to project as at 40', FIG. 3, into the chamber 29 of the steam separator beneath a ledge 43 of horizontal wall 26 and in abutment, or near abutment, with the wall 28. This projecting end portion 40' of baffle 40 overlies a descending drain pipe 44 secured in the bottom wall portion 45 of the steam separator.

It may be seen that a single coupling composed of the flanges 35 and 37 enables the attachment of the distribution manifold 30 and condensate baffle 40 to the steam separator 17 in a compact and stable arrangement. Within the chamber 29, the projecting baffle portion 40' separates the steam from the condensate which flows along the bottom of manifold 30 beneath the baffle to the drain pipe 44. No internal or external condensate tubing is required. The arrangement also enables some of the returning condensate to be flashed into steam in the chamber 29 and returns to the nozzles 34, thus improving the operational efficiency of the humidifier. This capability of the invention is lost in the prior art where the condensate usually flows through external tubing leading from the far end of manifold 30 to a drain pipe outside of the separator 17.

As shown in FIGS. 6-8, the invention is applicable to central steam humidifiers of various configurations differing from the basic humidifier shown in FIGS. 1-5. For example, as shown in FIGS. 6 through 8, the central humidifier may include a main rectangular steam distribution manifold 46 spanning an air duct 47 in a heating system. The previously-described inverted V baffle 48 with condensate inlets 49 is disposed in the bottom of the rectangular manifold 46, as shown. Rising parallel branch steam distribution manifolds 50 on the main manifold 46 span the air duct 47 and each such branch has opposing staggered steam distribution nozzle tubes 51 disposed therein. These tubes 51 are similar or identical to the described nozzle tubes 34.

The principal features of the invention, namely, the single coupling means 35 and 37 and the projection of the condensate baffle into the steam separator are common to both embodiments shown in the drawings. That is to say, the main manifold branch 46 and the baffle 48 therein are connected to the separator 17, not shown in FIG. 6, in the identical manner shown in FIG. 3.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. In a steam humidifier, a steam separator, a steam distribution manifold leading from said separator and having steam distribution nozzles thereon, a condensate baffle disposed in the bottom of said manifold and extending for substantially the length of the manifold and projecting beyond the end of the manifold which communicates with said steam separator, the improvement comprising a single coupling means securing said manifold and baffle in assembled relationship with a chamber of the steam separator with the projecting portion of the baffle inside of such chamber in overlying relationship to a condensate drain leading from such chamber, and the adjacent end of the manifold being in direct communication with such chamber of the steam separator.

2. In a steam humidifier as defined in claim 1, and wherein said baffle is a continuous inverted V-cross section baffle having longitudinally spaced condensate inlet notches formed in the bottom edges of its opposite side walls within said manifold.

3. In a steam humidifier as defined in claim 1, and said single coupling means comprising a coupling flange fixed on said manifold near one end thereof, an opposing mating coupling flange on the steam separator having an opening receiving the adjacent end portion of the manifold, and fastener elements securing said flanges in coupled relationship.

4. In a steam humidifier as defined in claim 1, and an internal wall in the steam separator defining a steam metering chamber therein in direct communication with said distribution manifold, said wall having a projecting ledge above the condensate drain and said projecting portion of the baffle underlying said ledge.

5. A steam humidifier comprising a valved steam separator adapted to receive steam from an external source and having a flanged outlet and a condensate drain near and inwardly of said outlet, a steam distribution manifold including multiple spaced distribution nozzles having a flange near and inwardly of one end of the manifold adapted to abut the flange of said flanged outlet, said outlet telescopically receiving the adjacent end portion of said manifold so that one end of the manifold projects through the outlet and into the steam separator near the condensate drain, means securing the flange of the manifold in abutting relationship to the flange of the flanged outlet, and an elongated condensate baffle resting in said manifold and extending for a major portion of its length and including an end portion projecting beyond the end of the manifold which is within the steam separator and being within the steam separator above and in overlying relationship to the condensate drain of the steam separator.

6. A steam humidifier as defined in claim 5, and said condensate baffle comprising an arched baffle having a pair of longitudinal lower edges resting on the wall of the manifold, and said edges having spaced condensate inlet openings along the length of the baffle.

* * * * *